US007395191B2

(12) United States Patent  
Detwiler et al.

(10) Patent No.: US 7,395,191 B2
(45) Date of Patent: Jul. 1, 2008

(54) COMPUTER-IMPLEMENTED LAND PLANNING SYSTEM AND METHOD DESIGNED TO GENERATE AT LEAST ONE CONCEPTUAL FIT SOLUTION TO A USER-DEFINED LAND DEVELOPMENT PROBLEM

(75) Inventors: Michael W. Detwiler, Cornelius, NC (US); James W. Reynolds, Jr., Statesville, NC (US); Anthony H. Watts, Winston-Salem, NC (US)

(73) Assignee: Blueridge Analytic, Inc., Winston-Salem, NC (US)

( * ) Notice: Subject to any disclaimer, the term of this patent is extended or adjusted under 35 U.S.C. 154(b) by 269 days.

(21) Appl. No.: 11/190,662

(22) Filed: Jul. 27, 2005

(65) Prior Publication Data

US 2006/0025971 A1 Feb. 2, 2006

Related U.S. Application Data

(60) Provisional application No. 60/591,850, filed on Jul. 28, 2004.

(51) Int. Cl.
G06F 17/10 (2006.01)
G06F 17/00 (2006.01)
G06F 7/60 (2006.01)
G06F 7/00 (2006.01)
G06F 19/00 (2006.01)
G06F 17/50 (2006.01)

(52) U.S. Cl. .................... 703/1; 703/2; 700/97; 700/98; 700/99

(58) Field of Classification Search .............. 703/1, 703/3, 2; 700/97, 98, 99; 705/7, 10
See application file for complete search history.

(56) References Cited

U.S. PATENT DOCUMENTS

| 4,964,060 | A  | * | 10/1990 | Hartsog ....................... 703/1 |
| 5,867,397 | A  |   | 2/1999  | Koza et al. |
| 6,532,453 | B1 |   | 3/2003  | Koza et al. |
| 2001/0047251 | A1 | * | 11/2001 | Kemp ........................... 703/1 |
| 2002/0010572 | A1 | * | 1/2002  | Orton et al. ................ 703/22 |
| 2003/0023412 | A1 | * | 1/2003  | Rappaport et al. ............ 703/1 |
| 2003/0036889 | A1 | * | 2/2003  | Goodman et al. ............ 703/1 |
| 2003/0061012 | A1 | * | 3/2003  | Orr et al. ...................... 703/1 |
| 2004/0117777 | A1 | * | 6/2004  | Lichana ...................... 717/151 |
| 2004/0260573 | A1 |   | 12/2004 | Schmitt |
| 2005/0078110 | A1 |   | 4/2005  | Lewis et al. |
| 2005/0086096 | A1 |   | 4/2005  | Bryant |

OTHER PUBLICATIONS

Schoenstein, Michael. "AutoCAD Land Development Desktop Release 2i", Digital Earth Moving: First International Symposium, DEM 2001, Sep. 5-7, 2001 Proceedings, 6 pages.*

Autodesk, Inc. "Greater Cincinnati Water Agency Flows Freely with Land Development Desktop", Nov. 22, 2002, 4 pages.*

(Continued)

*Primary Examiner*—Kamini Shah
*Assistant Examiner*—Suzanne Lo
(74) *Attorney, Agent, or Firm*—Schwartz Law Firm, P.C.

(57) ABSTRACT

A computer-implemented land planning system is designed to generate at least one conceptual fit solution to a user-defined land development problem. The system electronically creates at least one candidate solution to the land development problem. The candidate solution incorporates a number of engineering measurements applicable in development of an undeveloped land site. A fitness function quantitatively evaluates the candidate solution based on its fitness. A heuristic problem-solving strategy manipulates the engineering measurements of the candidate solution to achieve a more quantitatively fit solution to the land development problem. A computer output device outputs to a user documentation illustrating the fit solution to the land development problem.

19 Claims, 12 Drawing Sheets

OTHER PUBLICATIONS

Autodesk, Inc. "AutoCAD Land Development Desktop Getting Started Guide", 1999, 285 pages.*

Bentley System, Incorporated. "Geopak Site", Updated Aug. 1, 2005, 9 pages.*

Cook et al. "Virtual reality for large-scale industrial applications" Future Generation Computer Systems 14, 1998, pp. 157-166.*

B. Chandrasekaran, "Review of Intelligent Systems for Engineering: A Knowledge-Based Approach", American Association for Artificial Intelligence, Winter 2000, Book review, pp. 123-124.

David C. Brown, "Review of 1993 Article on Intelligent Computer-Aided Design" Encyclopedia of Computer Science and Technology, Sep. 1998, pp. 2-45.

Dr. Marir Farhi.,Dr. Aouad Ghassan. and Dr. Cooper Grahame., Editor C. Eastman, "Osconcad: A Model-Based Cad System Integrated With Computer Applications", itcon.org, Dec. 1998, pp. 27-45.

Dan Loughlin and Gary Goldstein, "Exploring Near-Equilibrium Solutions: The MARKAL-MGA Algorithm and Use", ETSAP 2004 Spring Meeting, Paris France, Jun. 21, 2004, pp. 1-8.

"Genetic Algorithms and Evolutionary Computation", What is a genetic algorithm?, www.talkorgins.org/faqs/genalg.html, pp. 1-11, published prior to Jun. 23, 2005.

Thomas E. Delaney, "The Genetic Model In Business Application Development, Artificial Intelligence in Business Series", Delaney Software Services Inc. Jun. 23, 2005 pp. 1-18.

"AutoCAD Land Development Desktop Release 2", CRC Civil Engineering Solution Tour, pp. 1-2, www.cadresource.com/tour/civil.html, last updated Mar. 14, 2001.

Bouchlaghem, N. M., and Liyanage, I. G. (1996) Virtual Reality Applications in the UK's Construction Industry, *Construction on the Information Highway*, CIB W78 Working Commission on Information Technology in Construction, Bled (Slovenia), Turk, Z. (Ed), University of Ljublajana.

* cited by examiner

PROPERTY BOUNDARY

PARCEL DESCRIPTION
[                    ]

PROPERTY BOUNDARY (FILE)
[                    ] [UPLOAD]

EXISTING TOPOGRAPHY (FILE)
[                    ] [UPLOAD]

EXISTING UTILILIES (FILE)
[                    ] [UPLOAD]

VEHICLE ENTRANCES (FILE)
[                    ] [UPLOAD]

VEHICLE ENTRANCE SPECIFICATION

TWO WAY TRAFFIC REQUIRED?   NUMBER OF LANES ENTERING   NUMBER OF EXIT LANES
☐                           [                    ]     [                    ]

MINIMUM NUMBER OF ENTRANCES  MINIMUM GRADE              MAXIMUM GRADE
[                    ]       [                    ]     [                    ]

ENTRANCE LANE WIDTH (FEET)   EXIT LANES WIDTH (FEET)
[                    ]       [                    ]

CORNER RADIUS                MINIMUM DISTANCE WITH NO PARKING (FEET)
[                    ]       [                    ]

[REFRESH] [SAVE]

FIG. 4

| CLEARING AND EXCAVATION | EROSION CONTROL | MATERIALS |
|---|---|---|
| CLEARING | ECF | FILL |
| STRIPPING | CONSTRUCTION EROSION | BORROW |
| EARTH | | WASTE |
| ROCK | | COMPACTION |
| UNSUITABLE | | |
| RETAINING WALLS | PAVING AND CONCRETE | OTHER |
| LESS THAN 5ft TALL | PAVING | FINISH |
| 5ft – 10ft TALL | SIDE WALK | SEEDING |
| GREATER THAN 10ft TALL | CURB | DEMOLITION COST |

SAVE

FIG. 5

RCP STORM WATER PIPES

LESS THAN 5ft DEEP

5ft –10ft DEEP

GREATER THAN 10ft DEEP

5ft DIAMETER STORM WATER MANHOLES

LESS THAN 5ft DEEP

5ft –10ft DEEP

GREATER THAN 10ft DEEP

CURB INLETS

LESS THAN 5ft

5ft –10ft

GREATER THAN 10ft

DROP INLETS

LESS THAN 5ft

5ft –10ft

GREATER THAN 10ft

OTHER

STORAGE

FES

VOLUME OF RIP RAP

SAVE

FIG. 6

GRAVITY FLOW CONDUIT (CLICK TO EXPAND/COLLAPSE)
FORCE MAIN CONDUIT (CLICK TO EXPAND/COLLAPSE)

| DESIGN PEAK FACTOR | MANNING'S N | HAZEN WILLIAMS C |
|---|---|---|
| MIN. FULL FLOW VELOCITY (FEET/SEC) | MAX. FULL FLOW VELOCITY (FEET/SEC) | MIN. DEPTH OF COVER(FEET) |

PIPE MATERIAL DESCRIPTION

OTHER INPUTS (CLICK TO EXPAND/COLLAPSE)

SAVE

FIG. 7

GRAVITY FLOW CONDUIT (CLICK TO EXPAND/COLLAPSE)

DESIGN PEAK FACTOR    MANNING'S N    MIN. PIPE DIAMETER(INCHES)

MIN. FULL FLOW VELOCITY (FEET/SEC)    MAX. FULL FLOW VELOCITY (FEET/SEC)    MIN. DEPTH OF COVER(FEET)

PIPE MATERIAL DESCRIPTION

FORCE MAIN CONDUIT (CLICK TO EXPAND/COLLAPSE)
OTHER INPUTS (CLICK TO EXPAND/COLLAPSE)

SAVE

FIG. 8

GRAVITY FLOW CONDUIT (CLICK TO EXPAND/COLLAPSE)
FORCE MAIN CONDUIT (CLICK TO EXPAND/COLLAPSE)
OTHER INPUTS (CLICK TO EXPAND/COLLAPSE)

AVG. DAILY WASTE WATER FLOW
(CUBIC FEET/SEC)           MAX. MANHOLE SPACING (FEET)   MAX. CLEANOUT SPACING (FEET)

MIN. INVERT ELEVATION (FEET)   PUMP EFFICIENCY PERCENTAGE   MIN. PUMP CYCLE TIME (MINUTES)

MAX. PUMP CYCLE TIME (MINUTES)   WET WELL DIAMETER (FEET)   MAX. WET WELL DEPTH (FEET)

MIN. PUMP HORSEPOWER   MAX. PUMP HORSEPOWER   DESCRIPTION

ODOR CONTROL INCLUDED?   STANDBY GENERATOR PROVIDED?
☐                        ☐

SAVE

FIG. 9

COMPUTER-IMPLEMENTED LAND PLANNING SYSTEM AND METHOD DESIGNED TO GENERATE AT LEAST ONE CONCEPTUAL FIT SOLUTION TO A USER-DEFINED LAND DEVELOPMENT PROBLEM

TECHNICAL FIELD AND BACKGROUND OF THE INVENTION

This invention relates to a computer-implemented land planning system and method designed to generate at least one conceptual fit solution to a user-defined land development problem. The invention is equally applicable to the planning and development of single and multi-pad commercial, mixed use, and residential land sites.

The process used today by professional real estate developers, corporations, government entities and others to assess land for engineering feasibility, cost of developing, and investment purposes is time consuming, inaccurate, and expensive. Unfortunately, the current process is getting even more complex and expensive due to added bureaucratic complications with land use zoning, environmental protection requirements, extended permitting processes as well as the availability and escalating cost of land in desirable areas. This problem affects a broad spectrum of land users including, for example, real estate developers (office/industrial, commercial, retail, residential), corporations which own and use real estate (public/private), and government entities (Federal, State, County, City).

For each of the above users, assessing the feasibility of a land site for development typically involves a land development team including one or more architects, engineers, and land planners. Many of these team members are engaged to layout and plan the intended uses on the site being considered. This initial planning process can take from 2 days to four weeks, and usually results in a single schematic drawing with limited information (e.g., will the site support the building footprints or building lots and the necessary streets and/or parking lots?). At this point, based largely on intuition and a "gut feeling" about the project, the developer will choose to contract for additional planning and engineering to more accurately assess the feasibility of the plan and the budget. This process can take 2 weeks to 16 weeks and usually results in only one option that is based on the designer's experience but is not optimized in any respect. This information is then used to estimate a more accurate budget. Often times value engineering is required to bring the design back within the original budget. This process takes 2 weeks to 6 weeks. The final budget is not generally determined until the end of the planning process—some 3-4 mos after initial consideration of the land site.

The above planning process often must occur before the property is purchased, and requires substantial investment in legal fees and earnest money to hold the property for an extended length of time.

After this 4 week to 28-week process (average 16 weeks) and considerable expense and risk of lost opportunity, the developer must assess the risk of purchasing and developing the property based on one unoptimized design option. Unfortunately, the process outlined above is complicated even further by miscommunication and disconnect between the many groups involved, which often results in bad designs, bad budgets, disagreements, and bad projects.

The present applicant recognized that the land development industry needs a major paradigm shift, which is now possible through advances in mathematical modeling and computing hardware. One primary goal of the present invention is to fix the problems outlined above through a virtual engineering system that can produce many optimized alternatives for land development—including the planning, engineering, and budgeting of each potential solution. This computing process is generally achieved in a maximum 24-hour period.

Heuristic Strategy

The speed and effectiveness of the present invention is advanced using a heuristic mathematical approach, such as genetic algorithms. Concisely stated, a genetic algorithm (or "GA") is a programming technique that mimics biological evolution as a problem-solving strategy. Given a specific problem to solve, the input to the GA is a set of potential solutions to that problem, encoded in some fashion, and a metric called a fitness function that allows each candidate to be quantitatively evaluated. These candidates may be solutions already known to work, with the aim of the GA being to improve them, but more often they are generated at random.

From these initial candidate solutions, random changes are introduced through processes known as mutation and crossover. The resulting digital offspring then go on to the next generation, forming a new pool of candidate solutions, and are subjected to a second round of fitness evaluation. Those candidate solutions which were worsened, or made no better, by the changes to their code are again deleted; but again, purely by chance, the random variations introduced into the population may have improved some individuals, making them into better, more complete or more efficient solutions to the stated problem. Again these winning individuals are selected and copied over into the next generation with random changes, and the process repeats. The expectation is that the average fitness of the population will increase each round, and so by repeating this process for hundreds or thousands of rounds, very good solutions to the problem can be discovered.

SUMMARY OF INVENTION

Therefore, it is an object of the invention to provide a computer-implemented land planning system and method designed to generate at least one conceptual fit solution to a user-defined land development problem.

It is another object of the invention to provide a computer-implemented land planning system which utilizes a heuristic problem solving-strategy, such as genetic algorithms. According to the present genetic algorithm, the evolution starts from a population of completely random individuals and happens in generations. In each generation, the fitness of the whole population is evaluated, multiple individuals are stochastically selected from the current population (based on their fitness), modified (mutated or recombined) to form a new population, which becomes current in the next iteration of the algorithm.

It is another object of the invention to provide a computer-implemented land planning system which performs land planning and engineering simultaneously. This invention considers all land development parameters (e.g., site specifications, user constraints, cost information) up front from both the land planner and the engineer perspective, and then explores millions of options using heuristic algorithms to determine which options are best as determined by cost and revenue.

It is another object of the invention to provide a computer-implemented land planning system which applies a heuristic problem-solving strategy to the current civil engineering process to revolutionize residential and commercial land planning and development.

It is another object of the invention to provide a computer-implemented land planning system which shortens the time it takes to get a final engineering drawing (85% complete or more), including cost information, from 3-4 months to less than 24 hours in many cases.

It is another object of the invention to provide a computer-implemented land planning system which provides technology, accessible via the web, which will enable a user to determine the most cost-effective way to develop a land site.

It is another object of the invention to provide a computer-implemented land planning system which enables visualization of a land development problem and the ultimate solution.

It is another object of the invention to provide a computer-implemented land planning system which gives the land developer direct access to qualified information in roughly 24 hours (or less) versus many months.

It is another object of the invention to provide a computer-implemented land planning system which minimizes the initial investment capital required for developing a land site.

It is another object of the invention to provide a computer-implemented land planning system which lowers engineering costs.

It is another object of the invention to provide a computer-implemented land planning system which minimizing the risk associated with developing a land site.

It is another object of the invention to provide a computer-implemented land planning system which optimizes engineering time.

It is another object of the invention to provide a computer-implemented land planning system which effectively integrates the creative (aesthetics) and engineering sides of land planning and development to achieve a globally optimal solution.

It is another object of the invention to provide a computer-implemented land planning system which optimizes around financial measurements, such as cost and return on investment (ROI).

It is another object of the invention to provide a computer-implemented land planning system which generates multiple "optimally different" solutions to a land development problem, and which presents the solutions in a ".dwg" format that can be input and manipulated directly into an engineers' existing CAD/CAM system.

It is another object of the invention to provide a computer-implemented land planning system which is available for use on stand-alone PCs or networks.

It is another object of the invention to provide a computer-implemented land planning system which utilizes Digital Satellite Topography.

It is another object of the invention to provide a computer-implemented land planning system which utilizes a heuristic problem-solving strategy capable of manipulating many parameters simultaneously.

It is another object of the invention to provide a computer-implemented land planning system which utilizes a heuristic problem-solving strategy which searches beyond the local optima.

It is another object of the invention to provide a computer-implemented land planning system which utilizes a heuristic problem-solving strategy designed to find the global optimum in a space with many local optima.

It is another object of the invention to provide a computer-implemented land planning system which utilizes a heuristic problem-solving strategy applicable in traffic engineering including signal optimization and highway design.

It is another object of the invention to provide a computer-implemented land planning system which utilizes a heuristic problem-solving strategy applicable for optimizing the structural design of buildings and bridges.

These and other objects of the present invention are achieved in the preferred embodiments disclosed below by providing a computer-implemented land planning system designed to generate at least one conceptual fit solution to a user-defined land development problem. The system employs a computer readable medium and a computer program encoded on the medium. The computer program is operable, when executed on a computer, for electronically creating at least one candidate solution to the land development problem. The candidate solution incorporates a plurality of engineering measurements applicable in development of an undeveloped land site. A fitness function quantitatively evaluates the candidate solution based on its fitness. A heuristic problem-solving strategy manipulates the engineering measurements of the candidate solution to achieve a more quantitatively fit solution to the land development problem. An output means, such as a display monitor, printer, electronic communication, or the like, delivers to a user documentation illustrating the fit solution to the land development problem.

The term "planning" is defined broadly herein to refer to any conceptual development of a land site. The term "undeveloped land site" refers to a site which may or may not have existing structure and/or engineering infrastructure, and which is not yet developed according to one of the conceptual fit solutions generated in the present system. The term "heuristic" refers broadly to any problem-solving strategy that utilizes self-educating techniques (as the evaluation of feedback) to improve performance. The following are examples of heuristic problem-solving strategies: evolutionary algorithms, such as genetic algorithms, simulated annealing, neural networks, hill climbing, Ant Colony optimization, Particle Swarm optimization, and tabu search.

According to another preferred embodiment, means, such as a digital terrain model, digitally represents the undeveloped land site in three-dimensional space.

According to another preferred embodiment, a computer program comprises instructions for conceptually locating the engineering measurements within the three-dimensional space.

According to another preferred embodiment, the engineering measurements are selected from a group including, but not limited to, storm water system, sanitary sewer collection system, and potable water system.

According to another preferred embodiment, the output documentation comprises a least one computer-generated drawing.

According to another preferred embodiment, the output documentation further comprises an itemized cost listing of the engineering measurements.

According to another preferred embodiment, the documentation is delivered to the user via a global communications network.

In another embodiment, the invention is a computer-implemented land planning system designed to generate at least one conceptual fit solution to a user-defined land development problem. A processor accesses land development constraints for an undeveloped land site. The system further employs a computer readable medium and a computer program encoded on the medium. The computer program is operable, when executed on a computer, for creating a population of candidate solutions to the land development problem. Each candidate solution includes a plurality of engineering measurements applicable in development of the undeveloped land site. The processor accesses a cost model including respective cost data for each of the engineering measurements. A computer program comprises instructions for discarding unfit solutions which violate the land development constraints. For each remaining solution, a fitness function is employed for calculating a fitness score based on the cost data for the engineering measurements. A heuristic problem-solving strategy manipulates the engineering measurements of respective select candidate solutions to achieve increased fitness scores, such that those candidate solutions achieving increased fitness scores comprise respective fit solutions. A computer program comprises instructions for selecting a set of optimally different alternative solutions from the plurality of fit solutions. An output means, such as a display monitor, printer, electronic communication, or the like, is employed for delivering to a user documentation illustrating the optimally different alternative solutions to the land development problem.

According to another preferred embodiment, the processor accesses user preferences for the undeveloped land site.

According to another preferred embodiment, a computer program comprises instructions for penalizing the fitness score of a candidate solution based on violation of a user preference.

In yet another embodiment, the invention is a computer-implemented land planning method designed to generate at least one conceptual fit solution to a user-defined land development problem. The method includes the steps of electronically creating at least one candidate solution to the land development problem. The candidate solution comprises a plurality of engineering measurements applicable in development of an undeveloped land site. The candidate solution is evaluated quantitatively based on its overall fitness. A heuristic problem-solving strategy is then employed for manipulating the engineering measurements of the candidate solution to achieve a more quantitatively fit solution to the land development problem. After achieving a more fit solution, documentation illustrating the fit solution to the land development problem is output to the user.

BRIEF DESCRIPTION OF THE DRAWINGS

Some of the objects of the invention have been set forth above. Other objects and advantages of the invention will appear as the description proceeds when taken in conjunction with the following drawings, in which:

FIGS. 4-10 are computer screen shots showing various input fields used for building the cost model;

DESCRIPTION OF THE PREFERRED EMBODIMENT AND BEST MODE

Figure 1:
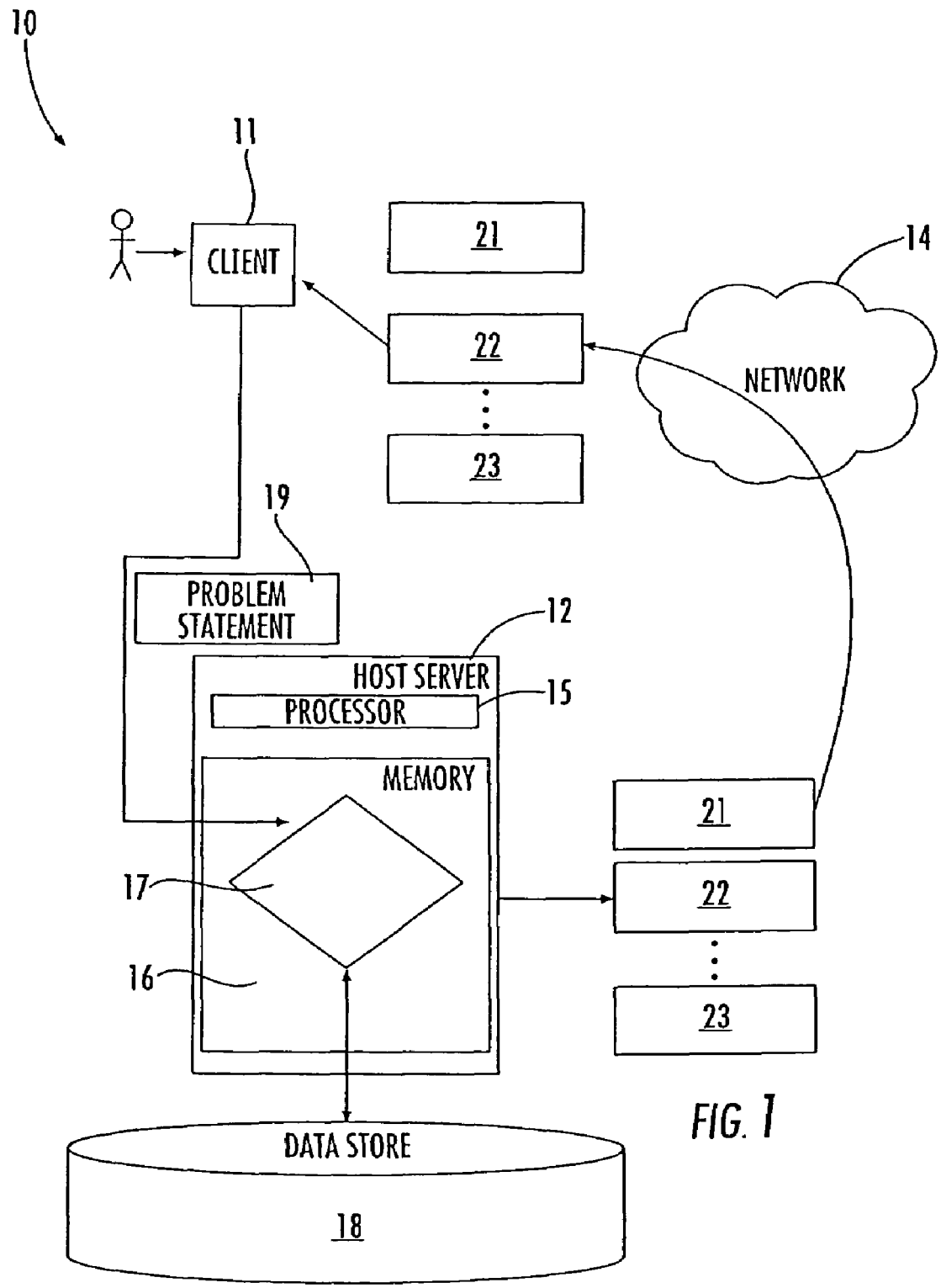
FIG. 1 is a schematic overview of the present land planning system according to one preferred embodiment of the invention.

Referring now specifically to the drawings, a computer-implemented land planning system according to the present invention is represented broadly in the schematic diagram of FIG. 1. The system employs a heuristic mathematical strategy to generate a set of globally-optimized solutions to a complex land development problem. In one embodiment described below, the problem is expressed in terms of optimizing land development based on costs and budget constraints. Alternatively, the system may focus on other economic considerations such as return on investment (ROI). The example discussed herein relates to the planning and development of a single pad commercial site. The present concept, however, is equally applicable to the planning and development of multi-pad commercial, mixed use, and residential sites.

I. System Overview

In one embodiment, the present system 10 operates in an environment utilizing a client device 11 in communication with a host server 12 over a computer network 14, such as the Internet. In other embodiments, other computer networks, for example, a wide area network (WAN), local area network (LAN), or intranet, may be used.

The host server 12 comprises a processor 15 and a computer readable medium 16, such as random access memory (RAM). The processor 15 is operable to execute certain heuristic problem-solving programs 17 stored in memory. Such processors may comprise a microprocessor, or any other processor. Such processors may also communicate with other computer-readable media that store computer program instructions, such that when the stored instructions are executed by the processor, the processor performs the steps described herein.

The problem-solving programs 17, discussed further below, and utilize, as inputs, data from a data storage device 18. In one embodiment the data storage device 18 comprises an electronic database. In other embodiments, the data storage device 18 may comprise an electronic file, disk, or other data storage device. The data storage device 18 may store engineering and cost modules, building codes and regulations, user data, and a repository. The data storage device 18 may also include other items useful to carry out the functions of the present system.

In one example, the problem-solving programs 17 comprise one or more genetic algorithms to "solve" a high level problem statement 19 defined by the user—e.g., optimizing land development at a site based on cost. The system 10 employs Digital Terrain Modeling to create a three-dimensional representation (DTM) of the land site. Certain cost measurements, discussed below, are then conceptually located within the DTM. The genetic algorithm 17 is used to optimize the design of the site based on these cost measurements. The genetic algorithm 17 evolves multiple fit solutions to the land development problem 19. These fit solutions are then interrogated and electronically filtered to achieve a small number of very different alternative solutions 21, 22, and 23. The resulting alternatives 21, 22, 23 are transferred over the computer network 14 to the client device 11. The user is then able to decide which fit solution 21, 22, 23 best satisfies his or her design goals.

II. Cost Measurements

In the present example, each candidate solution is defined by five cost measurements which are scored individually for fitness based on a predetermined quantitative scale. The score or "fitness index" for each measurement is then totaled to evaluate the overall fitness of the given solution. The cost measurements comprise: the building pad, parking lot and access roads, storm water collection system, sanitary sewer collection system, and potable water system. Each measurement is conceptually located on the site and engineered based on system parameters and user-defined hard and soft constraints, discussed below.

For locating the building pad, examples of factors influencing land development costs include initial site grading, demolition, clearing & grubbing, bulk excavation, fill placement (backfilling), retaining walls, erosion control, and finish grading. Site grading is generally the first task undertaken prior to construction, after which installation of utilities, paving, and building construction may begin. Unless the site is in an undeveloped state prior to construction, a cost will be incurred for the demolition of existing structures. Clearing consists of felling trees and removing and disposing of brush from the disturbed area prior to construction. Grubbing is the removal and disposal of stumps and roots. In some cases, a cost will also be included for topsoil stripping and stockpiling on site for later usage.

Bulk excavation involves the removal of earth for the construction of site features, and has the effect of lowering the elevation of the ground surface. Suitable material removed from excavation on site may be used to form embankments, fills, sub-grades, shoulders, backfills and site grading (i.e., to raise the grade). Cut and fill is preferably balanced on a given site. A cost may be incurred for transporting fill material from an excavation area to the fill area.

Retaining walls are constructed to prevent erosion and/or structural instability of excessively steep embankments. While there is a wide variety of retaining walls including timer tie, stone walls, reinforced masonry retaining wall with poured concrete footings, and segmental retaining wall systems, the type of wall used is largely a function of its required height and engineer preferences. A given retaining wall's maximum design height is a function of the retaining wall type and local soil and groundwater conditions. The present system will determine the location, required height, and length of any retaining walls on the site.

Typical erosion control practices during construction include silt fences, stabilized construction entrances, temporary seeding and mulching, inlet protection, check dams, and temporary sediment basins. Appropriate erosion control will be designed, and costs incurred, based upon the (x,y,z) coordinates of the disturbed area.

The system is designed to finish off all disturbed areas on the site to a uniformly smooth surface, free from abrupt or irregular surface changes. Included in this task is the redistribution of stockpiled topsoil as necessary in landscaped areas. Finished areas may later be landscaped or paved.

For the second measurement of the candidate solution, locating and designing the parking lot and access road(s) is a major cost component and driving force in the overall design for any single pad commercial site. Parking lot design guidelines are well established, and may be imported from existing databases. Parking lots are typically paved with asphalt comprising a base course of compacted stone (say 6" thick), and surface of asphalt (say 4" thick). The thickness of the various courses is a function of traffic loading and desired design life. Curb and gutter will be provided throughout the perimeter of the parking lot and any median island. In addition, a landscaping cost (e.g., for seeding and sodding) will be incurred for any area disturbed during construction that is not paved.

The cost measurement for storm water collection system includes providing storm water structures (e.g., drop inlets) and piping and best management practices (BMP's), if required. The primary costs associated with the drainage infrastructure are those associated with installing the pipe and structures. A storm water engineering 'model' may be utilized to determine the size and location of the various storm water facilities and associated quantities based on local site conditions (e.g. finished topography and rainfall) and standard engineering practices.

The measurement for sanitary sewer collection system comprises costs incurred for providing sanitary sewer service to the site. In most cases, an existing sanitary sewerage system will be available to connect to and will be located in an adjacent sewer easement. Sewer easements are typically located in the road's right-of-way (ROW). In the simplest case, for small single pad commercial sites, all that will be necessary is to install a sanitary sewer service lateral (say 6" diameter PVC material), including a cast iron cleanout, from the building to the existing trunk sewer in the street. In other cases, if wastewater flows originating at the facility are expected to be relatively high or if the building is far from the right-of-way it will be necessary to lay some new trunk sewer including manholes.

For potable water system, this measurement comprises costs incurred for providing drinking water, fire suppression and site irrigation to the land site. The is accomplished by connecting to the municipal or private water works. Like sanitary sewers, an existing water main is usually located in an adjacent water easement, which my be in the road ROW. The building is connected via a service connection, with at least one valve, a water meter, and a service tap at the water main completes the setup.

III. Digital Terrain Model (DTM)

The first step in implementing the present system is to define the site in three-dimensional "space." This is achieved through Digital Terrain Modeling using any suitable commercially available software such as Surface Modeling™ by Eagle Point Software, MGE Terrain Analyst™ by Intergraph Corporation, or GWN-DTM™ by Scientific Software Group.

Figure 2:
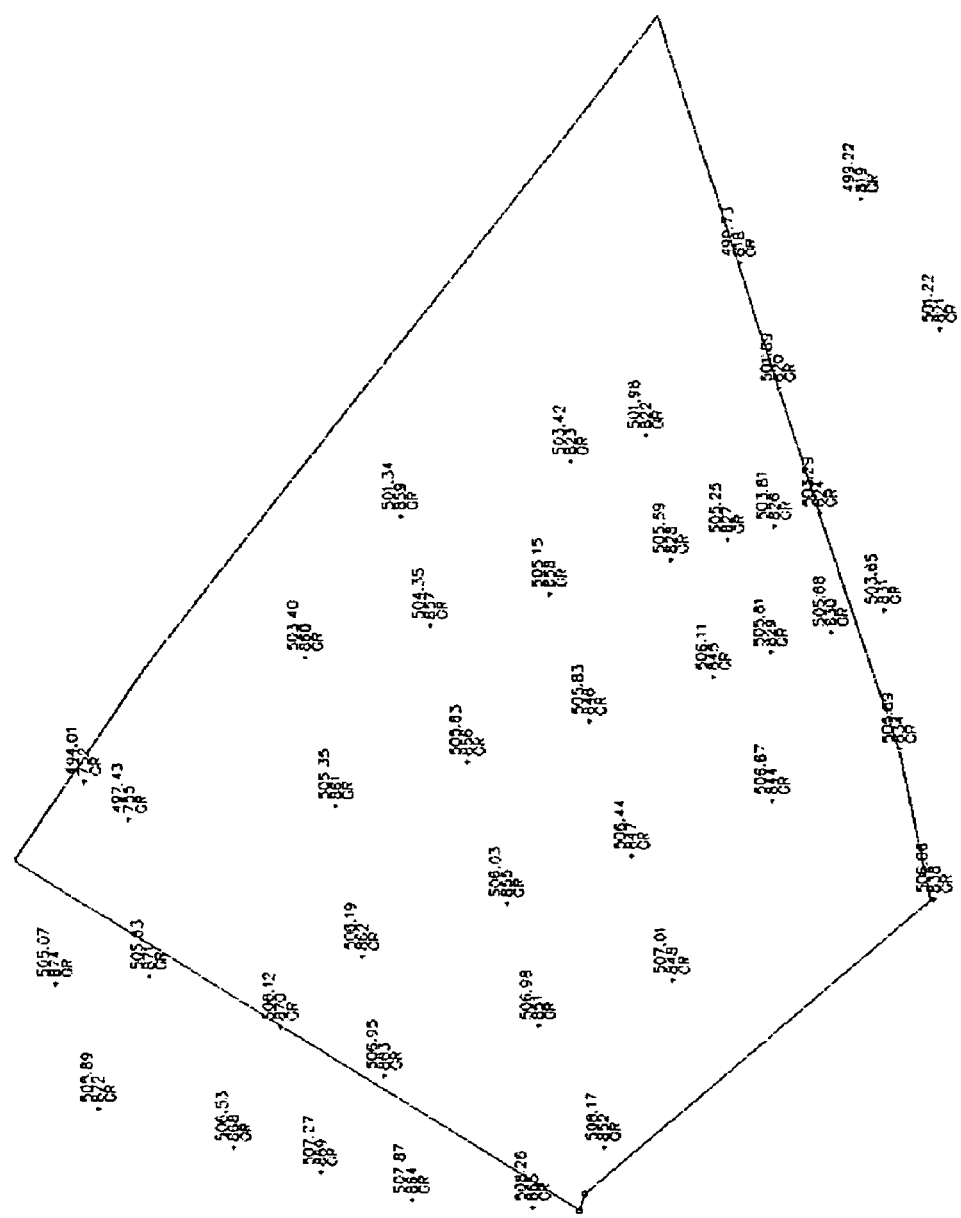
FIG. 2 is a plan view of the land site showing raw survey data at various points.
Figure 3:
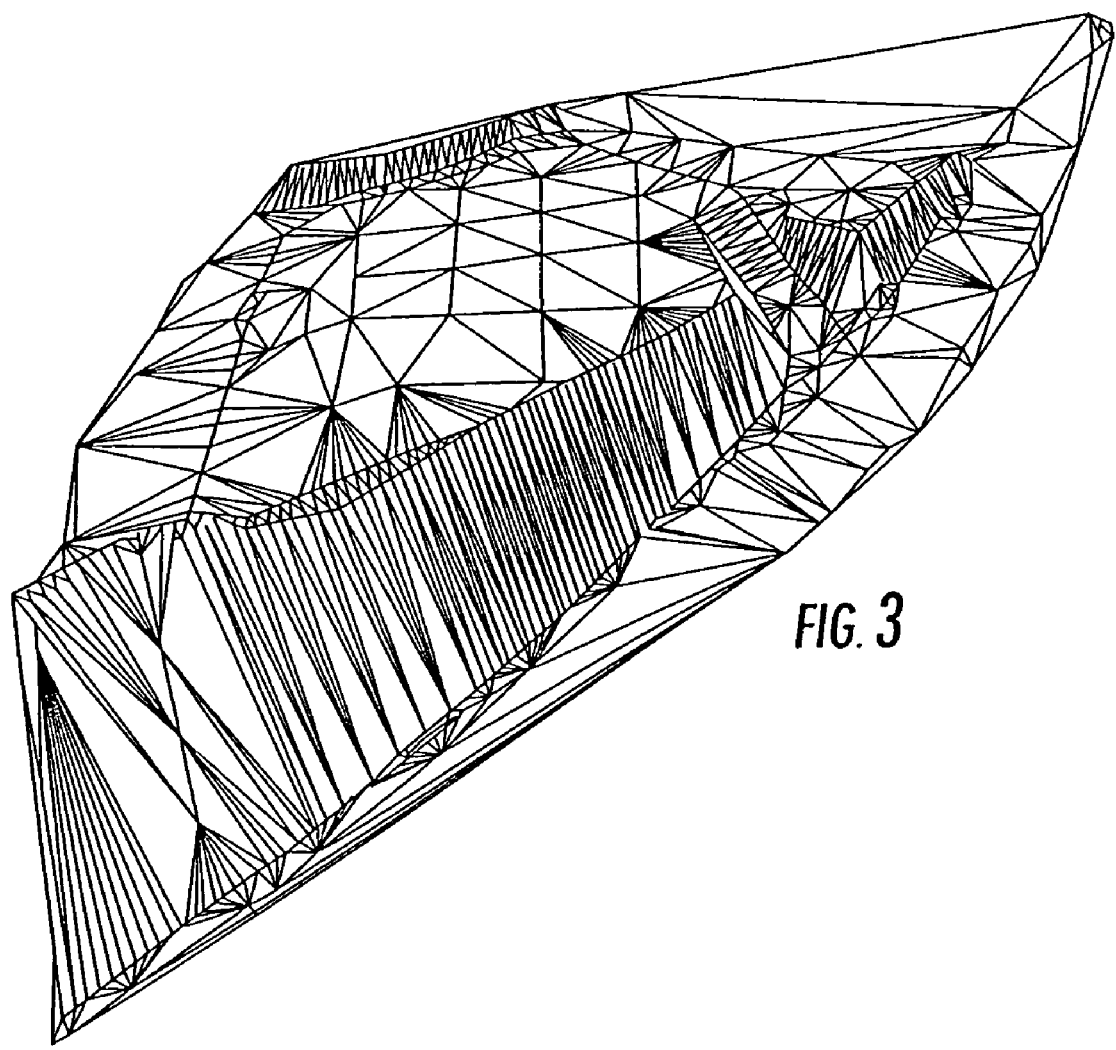
FIG. 3 is perspective view of the land site showing the Triangulated Irregular Network (TIN)
Figure 10:
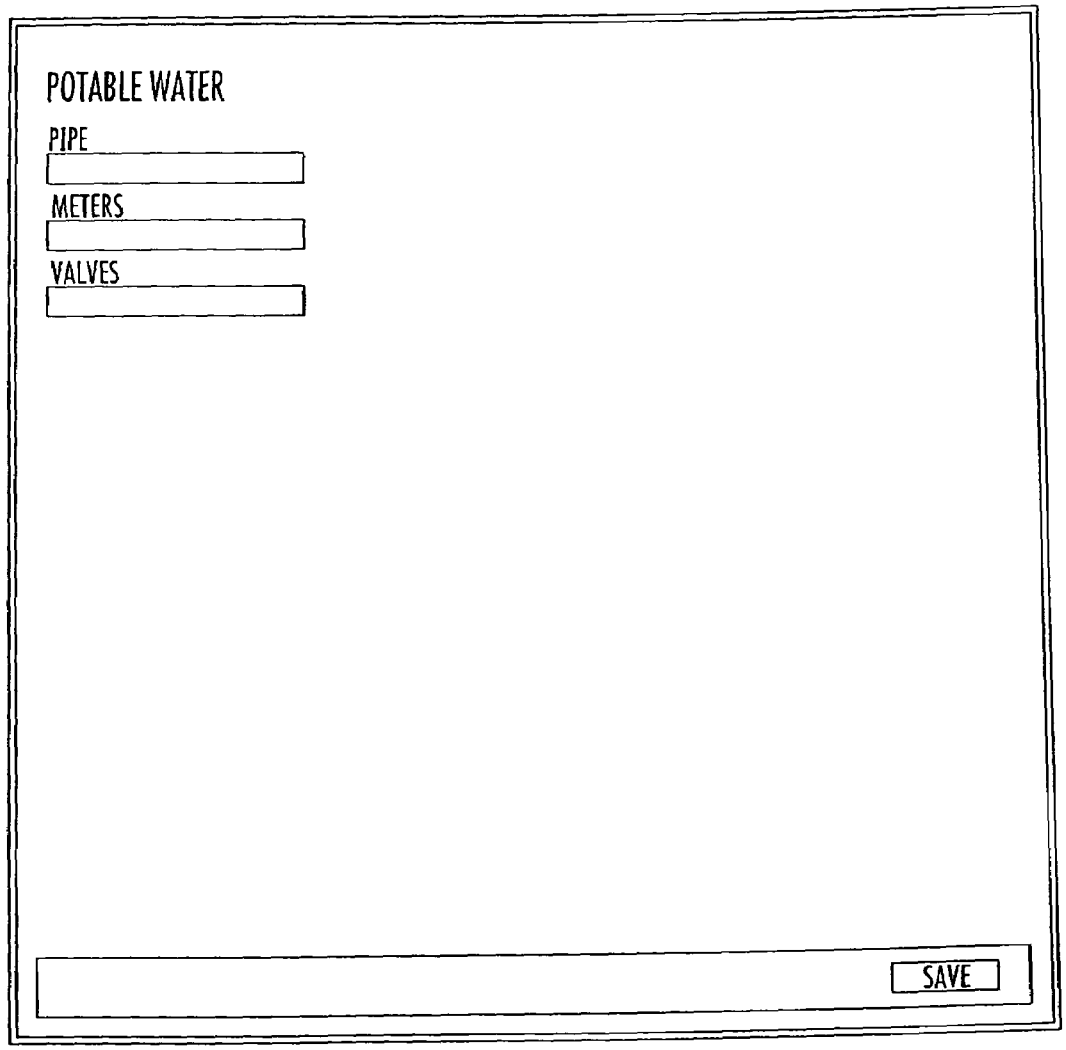

Digital Terrain Modeling is an electronic process of representing topography in three dimensions. The process utilizes raw survey data gathered at certain points chosen to accurately reflect site conditions, and through a Triangulated Irregular Network (TIN) converts this raw survey data into data used to effectively represent the site topography. FIGS. 2 and 3 illustrate the conversion of raw survey data (FIG. 2) into a three-dimensional representation of the site (FIG. 3). In the TIN, any three raw (x,y,z) coordinates define a finite triangular surface, with each vertex of the triangle representing an actually measured data point. A large series of these finite surfaces, sharing common horizontal edges, are linked together in the network and used to interpolate the (x,y,z) coordinate of any point, even though actual measurements have not been obtained at that point.

The TIN models the entire land surface of the site including boundaries and breaklines. Delaunay triangulation rules are followed in partitioning the points into the nodes of triangles. Concisely stated, all raw survey points are connected with their two nearest neighbors to form triangles. One of the main advantages of such triangles is that they are equiangular. It also ensures that any point on the surface is as close as possible to an actually measured survey point.

In the present system, each of the five cost measurements is represented in the DTM by a set of (x,y,z) coordinates—the set indicating northing, easting, and elevation of all points of the measurement in the site. The precise location of the measurement in the DTM determines its cost based on the cost model discussed below.

IV. Rules of Selection

Before application of the cost model, all candidate solutions must meet certain threshold requirements including those inherent in the system and those established adhoc by the user. Collectively, these requirements or constraints define rules of selection dictating which candidate solutions survive initial scrutiny for further consideration and possible regeneration. System constraints may include, for example, engineering parameters such as the depth of cover on water mains, depth of cover of sewer mains, minimum slope of sanitary sewer, pavement design requirements, flood plain and wetland area restrictions, minimum ditch designs, manhole dimensions, maximum/minimum grades, and others dictated by applicable engineering models. Other system constraints may comprise those stored electronically in databases containing applicable municipal codes for a given jurisdiction. These databases may include parameters such as street planting yards, side and rear planting yards, building setbacks, parking space sizes, driveway widths, roadway widths, water pipe materials, sewer pipe materials, and radius of entrances curb lines.

User-input constraints are both "hard" and "soft"—hard constraints comprising required or established parameters while soft constraints represent only preferences. Hard constraints include, for example, building pad design/dimensions, location of existing water line, location of existing sanitary sewer collection system, location of flood plain/wetland areas, and existing utility easements. Examples of user preferences or soft constraints include width of sidewalks, parking angles (e.g., 60 or 90 degrees), bike paths, and aesthetic considerations, such as frontage visibility (pad orientation), green space, and preservation of existing landscape.

V. Cost Model

The cost model is entered into the system using a series of GUI screens, such as those shown in FIGS. 4-10. Alternatively, the cost model may be imported from one or more databases or other data storage media. The costs included are those that have an engineering basis that can be modeled. Other fixed costs and fees are ignored in the cost model as they can be added in during a post-processing step to give a complete final cost estimate for the site. Preferably, the cost model incorporates the following data outlined in Tables 1, 2, 3, and 4 below.

TABLE 1

Grading Unit Costs

| | |
|---|---|
| Clearing and grubbing | $/SY |
| Topsoil stripping | $/CY |
| Bulk common earth excavation | $/CY |
| Rock excavation | $/CY |
| Excavation of unsuitable material | $/CY |
| Fill material | $/CY |
| Compaction of fill material | $/CY |
| Borrow Material | $/CY |
| Disposal of waste material | $/CY |
| Retaining wall (<5 ft tall) | $/SF |
| Retaining wall (5-10 ft tall) | $/SF |
| Retaining wall (>10 ft tall) | $/SF |
| Finish grading | $/acre |
| Paving for parking/access road for given thickness | $/SY |
| Concrete sidewalk | $/SY |
| Curb and gutter | $/LF |
| Seeding and mulching (or sod) | $/SY |
| Permanent erosion control fabric for steep slopes | $/SY |
| Erosion control during construction | $/acre |

TABLE 2

Storm Water System

| | |
|---|---|
| Underground detention storage | $/CY |
| RCP storm water pipe of each size (<5 ft deep) | $/LF |
| RCP storm water pipe of each size (5-10 ft deep) | $/LF |
| RCP storm water pipe of each size (>10 ft deep) | $/LF |
| Flared end section (FES) of each size | $/EA |
| Unit cost per volume of rip rap | $/CY |
| Storm water manholes of each size (<5 ft deep) | $/EA |
| Storm water manholes of each size (5-10 ft deep) | $/EA |
| Storm water manholes of each size (>10 ft deep) | $/EA |
| Curb inlets (<5 ft) | $/EA |

TABLE 2-continued

Storm Water System

| | |
|---|---|
| Curb inlets (5-10 ft deep) | $/EA |
| Curb inlets (>10 ft deep) | $/EA |
| Drop inlets (<5 ft) | $/EA |
| Drop inlets (5-10 ft deep) | $/EA |
| Drop inlets (>10 ft deep) | $/EA |
| Storm water lift stations | $/EA |
| Storm water lift station force main of each size | $/LF |

TABLE 3

Sanitary Sewer Collection System

| | |
|---|---|
| Sanitary sewer pipe of each size (<5 ft deep) | $/LF |
| Sanitary sewer pipe of each size (5-10 ft deep) | $/LF |
| Sanitary sewer pipe of each size (>10 ft deep) | $/LF |
| Sanitary sewer manholes of each size (<5 ft deep) | $/EA |
| Sanitary sewer manholes of each size (5-10 ft deep) | $/EA |
| Sanitary sewer manholes of each size (>10 ft deep) | $/EA |
| Sanitary sewer clean outs | $/EA |
| Sanitary sewer service connections | $/EA |
| Sanitary sewerage lift stations | $/EA |
| Septic tanks or package treatment plants | $/EA |
| Sanitary sewer force main of each size | $/LF |

TABLE 4

Potable Water System

| | |
|---|---|
| Water distribution pipe of each size | $/LF |
| Water meters | $/EA |
| Valves of each size | $/EA |
| Fire Hydrants | $/EA |
| Backflow Preventer Valves | $/EA |

VI. Conceptual Solution

Conceptual solutions to the land development problem are generated utilizing the DTM, rules of selection, and cost model described above. These solutions are optimized using a heuristic problem-solving strategy, such as genetic algorithms, simulated annealing, neural networks, hill climbing, Ant Colony optimization, Particle Swarm optimization, tabu search, and other computerized evolutionary techniques. In the present example, the system incorporates a genetic algorithm (GA) such as that represented in the flow diagram of FIG. 11. As previously indicated, a high level problem statement in the present example is: developing a site for single pad commercial usage based on predetermined cost measurements and budget constraints. The GA works to evolve a set of globally optimized solutions—each solution conceptually locating (within the site) the five cost measurements discussed above in a manner which is highly cost efficient, and which takes into consideration system and user constraints and user preferences.

Beginning at generation '0', the first step in the GA is to create an initial random population of conceptual solutions. Each solution comprises respective sets of (x,y,z) coordinates in the DTM representing the exact location of the building pad, parking lot & access roads, the storm water system, sanitary sewer collection system, and potable water system. This initial population may include thousands or more of potential solutions.

For each solution in the population, the five cost measurements are defined, respectively, by certain predetermined quantities calculated based on the precise location of the measurement in the DTM. For example, the building pad and parking lot & access roads impact grading variables, such as: the total disturbed area, total volume of excavated material, volume of excavated rock, volume of excavated unsuitable material, volume of fill material, retaining wall area, parking area, concrete sidewalk area, length of curb and gutter, and slope surface area. Storm water system variables include, for example, volume of underground detention storage, length of RCP storm water pipe of each size, number of flared end sections of each size, volume of rip rap, number of storm water manholes of each size, number of curb inlets, number of drop inlets, number of storm water lift stations, and length of PVC storm water force main of each size. Sanitary sewer collection system variables include, for example, length of PVC sanitary sewer of each size, number of sanitary sewer manholes of each size, number of sanitary sewer clean outs, number of sanitary sewer service connections, number of sanitary sewer lift stations, number of septic tanks or package treatment plants, and length of PVC sanitary sewer force main of each size. The potable water system variables include, for example, length of PVC water distribution pipe of each size, number of water meters, number of (cast iron) valves of each size, fire hydrants, and backflow preventers.

Figure 11:
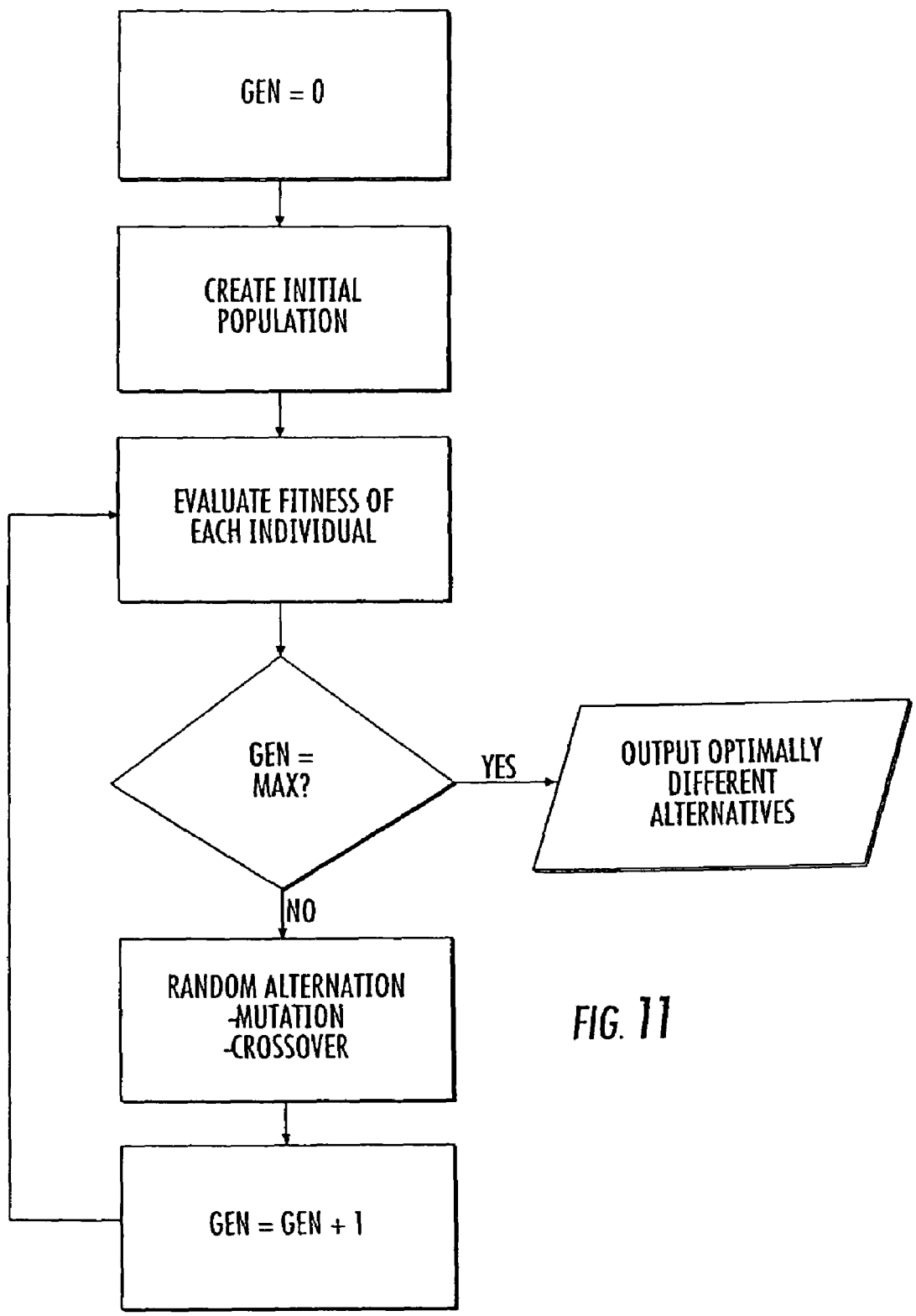
FIG. 11 is a flow diagram demonstrating basic operation of the genetic algorithm employed in the present system.

Referring again to the diagram of FIG. 11, after creating the initial random population, the next step is to apply a fitness function which quantitatively evaluates the fitness of each candidate solution. This step involves first determining the engineering feasibility of the solution, and whether the solution satisfies the rules of selection discussed above. If the solution meets these threshold requirements, it is then scored for fitness utilizing the cost model and any applicable penalties. If not, the solution is immediately discarded. An example of a solution discarded for lack of engineering feasibility is one which locates the building pad over the parking lot and/or access roads. This discarded solution would also likely violate a rule of selection relating to the proximity of the parking lot to the building pad. Another example of a solution discarded for a rules violation would be one where the building pad encroaches the setback.

For those solutions meeting the above threshold requirements, a fitness index is assigned to each of the five cost measurements. In the present example, assume that this index is a scale of 1-9; one (1) representing a measurement with high cost/high penalties, and nine (9) representing a measurement with low cost/low penalties. As previously stated, penalties are assigned to measurements which violate a user preference or "soft constraint". For example, if a user desires the building pad (store front) to face in a particular direction on the site in order to maximize visibility, any deviation from the desired pad orientation beyond a predetermined range would yield a penalty—or a minus score. A perfect fitness score in the present system is a solution which produces a nine for each measurement, or a '99999' score. Cost and penalties determine the fitness of each solution in the population. The cost of each measurement relates directly to its conceptual (x,y,z) location in the DTM, and is calculated based on the cost model.

In calculating the fitness index, the cost component is scored based on the measurement's ranking relative to other like measurements in the population. Thus, for example, all cost measurements for the building pad in the 90th and above fitness percentile would receive a '9' score, those in the 80th-89th fitness percentile would receive an '8' score, and so on. From this cost-component score, deductions are made for any penalties. This process is followed for all five cost measurements in each candidate solution.

After scoring each solution in the population, the GA determines whether a known termination criterion is satisfied. In the present example, the termination criterion is a preselected number of rounds or "generations". Assuming that this criterion is not yet satisfied, the system then selects certain candidate solutions to be copied over into the next generation. The GA can use many different techniques to accomplish this; namely, an elitist selection, fitness-proportionate selection, roulette-wheel selection, scaling selection, tournament selection, rank selection, generational selection, steady-state selection, and hierarchical selection. Some of these methods are mutually exclusive, but others can be and often are used in combination.

According to the elitist selection, the most fit solutions of each generation are guaranteed to be selected. In the fitness-proportionate selection, more fit individuals are more likely, but not certain, to be selected. The roulette-wheel selection is a form of fitness-proportionate selection in which the chance of a solution being selected is proportional to the amount by which its fitness is greater or less than its competitors' fitness. According to the scaling selection, as the average fitness of the population increases, the strength of the selective pressure also increases and the fitness function becomes more discriminating. This method can be helpful in making the best selection later on when all solutions have relatively high fitness and only small differences in fitness distinguish one from another. In the tournament selection, subgroups of solutions are chosen from the larger population, and members of each subgroup compete against each other. Only one solution from each subgroup is then chosen to reproduce. In the rank selection, each solution in the population is assigned a numerical rank based on fitness, and selection is based on this ranking rather than absolute differences in fitness. The advantage of this method is that it can prevent very fit individuals from gaining dominance early at the expense of less fit ones, which would reduce the population's genetic diversity and might hinder attempts to find an acceptable solution. In the generational selection, the offspring of the solutions selected from each generation become the entire next generation. No solutions are retained between generations. In the steady-state selection, the offspring of the solutions selected from each generation go back into the pre-existing population, replacing some of the less fit members of the previous generation. Some solutions are retained between generations. In hierarchical selection, solutions go through multiple rounds of selection each generation. Lower-level evaluations are faster and less discriminating, while those that survive to higher levels are evaluated more rigorously. The advantage of this method is that it reduces overall computation time by using faster, less selective evaluation to weed out the majority of solutions that show little or no promise, and only subjecting those who survive this initial test to more rigorous and more computationally expensive fitness evaluation.

In the present example, a rank/elitist selection method chooses all candidate solutions which have a cumulative score across all five measurements of at least a certain minimum number; e.g., 25. In this case, for example, solutions with respective fitness scores of '55555' and '11888' would be selected, while solutions scoring '33666' and '99111' would not.

Once selection has chosen fit solutions, they are then randomly altered in hopes of improving their fitness for the next generation. This random alteration occurs through mutation and crossover. A solution is mutated by slightly altering the (x,y,z) coordinates of any one or more of its cost measurements. Crossover entails choosing two solutions to swap one or more measurements, thereby producing artificial "offspring" that are combinations of their parents. With crossover, there is a transfer of information between successful "individuals"—solutions that can benefit from what others have learned, and schemata can be mixed and combined, with the potential to produce an offspring that has the strengths of both its parents and the weaknesses of neither.

The above process is repeated until the prescribed number of generations have been evolved. At that point, from the highest scoring solutions generated by the GA, a further mathematical algorithm outputs multiple optimally different alternatives for review and consideration by the user. The output is preferably one or more computer-generated (CAD) drawings of the site plan indicating the various measurements for each fit solution, and a written cost report itemizing and totaling all of the associated costs for developing the single pad commercial site. The process discussed below ensures that the output solutions are optimally different.

VII. Optimally Different Solutions

In the present example, an output algorithm is employed to interrogate the chosen GA solutions and output to the user only those that are optimally different. The primary goal of this algorithm is to generate a small number (e.g., 6-8) of very different alternatives.

The pseudo-code algorithm may read as follows:

GA selects multiple fit solutions

Repeat evaluate the (x,y,z) coordinates of all measurements in each fit solution select solutions which maximize the distance between coordinates of like measurements Until terminating condition.

In this case, the terminating condition would be reached once the desired number of very different, fit solutions is achieved. Alternatively, the output algorithm may employ other terminating criterion.

Figure 12:
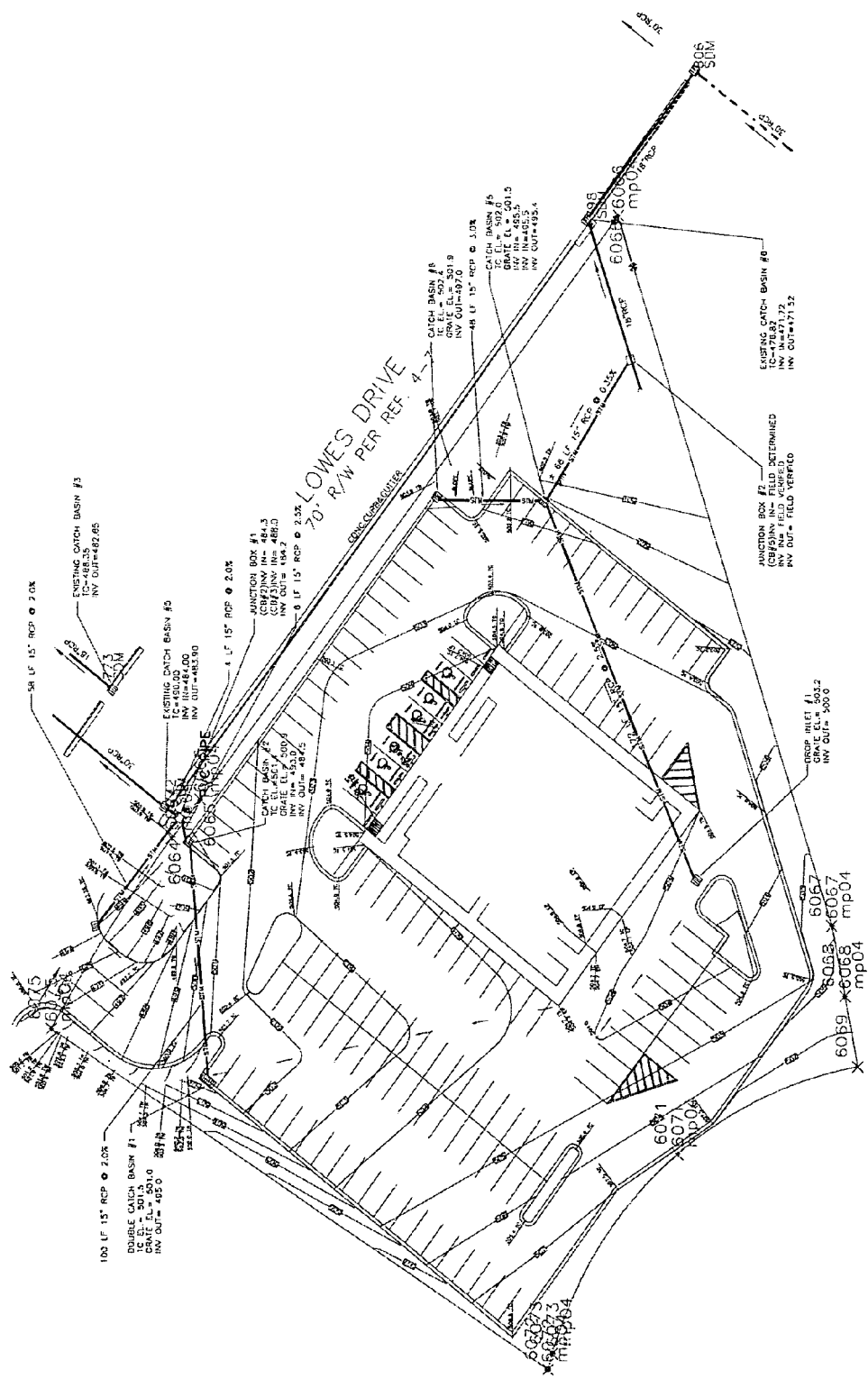
FIG. 12 is a computer-generated drawing of the developed land site according to one optimized fit solution.

As indicated above, the output documentation preferably comprises one or more computer-generated drawings and a written Cost Report. An example of an output drawing for one optimized, fit solution is provided in FIG. 12. The Solution Cost Report for this site is as follows:

| SOLUTION COST REPORT | | | | |
|---|---|---|---|---|
| Description | Unit | Quantity | Unit Cost | Total Cost |
| Building Subsystem | | | | |
| | | Subtotal Building Cost: | | $0.00 |
| | Driveway | | | |
| Curb and Gutter | LF | 198.35 | $12.20 | $2,419.89 |
| Heavy Duty Asphalt Paving | SY | 501.25 | $19.00 | $9,523.83 |
| | | Subtotal Driveway Cost: | | $11,943.71 |
| | Grading | | | |
| Clearing and Grubbing | Acre | 2.04 | $8,000.00 | $16,336.43 |
| Topsoil Stripping/Stockpiling | CY | 549.09 | $2.85 | $1,564.89 |
| Earth Excavation (Cut) | CY | 3,381.47 | $2.85 | $9,637.19 |
| Fill Placement | CY | 2,914.68 | $2.85 | $8,306.83 |
| Borrow Material | CY | 0 | $2.85 | $0.00 |
| Waste Material Disposal | CY | 141.51 | $6.00 | $849.06 |
| Retaining Wall (21.8 ft) | SF | 4,104.30 | $17.00 | $69,773.16 |
| Retaining Wall (6.2 ft) | SF | 329.34 | $17.00 | $5,598.82 |
| Finish Grading | Acre | 2.04 | $14,520.00 | $29,650.62 |
| Seeding and Mulching | Acre | 0.67 | $1,600.00 | $1,070.32 |
| | | Subtotal Grading Cost: | | $142,786.33 |
| | Parking Lot | | | |
| Curb and Gutter | LF | 951.55 | $12.20 | $11,608.97 |
| Standard Duty Asphalt Paving | SY | 5,826.50 | $13.94 | $81,221.46 |
| | | Subtotal Parking Lot Cost: | | $92,830.43 |
| | Potable Water System | | | |
| Water Pipe (1 inches) | LF | 255.4 | $14.50 | $3,703.34 |
| Connect to Existing Water Line (1") | EA | 1 | $850.00 | $850.00 |
| Water Service Meter (1") | EA | 1 | $2,250.00 | $2,250.00 |
| Building Control Valve (1") | EA | 1 | $0.00 | $0.00 |
| | | Subtotal Potable Water System Cost: | | $6,803.34 |
| | Sanitary Sewer Collection System | | | |
| Sanitary Sewer Gravity Pipe (4") | LF | 39.87 | $20.05 | $799.39 |
| Sanitary Sewer Gravity Pipe (4") | LF | 100.57 | $21.35 | $2,147.19 |
| Sanitary Sewer Gravity Pipe (4") | LF | 167.19 | $34.45 | $5,759.68 |
| Connection to Existing Sanitary Sewer Collection System | EA | 1 | $850.00 | $850.00 |
| Sewer Cleanout (4") | EA | 5 | $500.00 | $2,500.00 |
| | | Subtotal Sanitary Sewer Collection System Cost: | | $12,056.25 |
| | Storm Water Collection System | | | |
| Storm Water Gravity Pipe (18") | LF | 66.95 | $24.00 | $1,606.89 |
| Storm Water Gravity Pipe (15") | LF | 482.34 | $21.10 | $10,177.28 |
| Connection to Existing Storm Water Collection System | EA | 2 | $850.00 | $1,700.00 |

-continued

SOLUTION COST REPORT

| Description | Unit | Quantity | Unit Cost | Total Cost |
|---|---|---|---|---|
| Storm Water Manhole (60") | EA | 1 | $3,930.00 | $3,930.00 |
| Storm Water Inlet (48") | EA | 2 | $1,760.00 | $3,520.00 |
| Storm Water Inlet (48") | EA | 3 | $1,335.00 | $4,005.00 |
| Storm Water Manhole (48") | EA | 1 | $1,760.00 | $1,760.00 |
| Storm Water Inlet (48") | EA | 1 | $3,930.00 | $3,930.00 |
| | | Subtotal Storm Water Collection System Cost: | | $30,629.17 |
| | | Total Cost: | | $297,049.24 |

A computer-implemented land planning system and method are described above. Various details of the invention may be changed without departing from its scope. Furthermore, the foregoing description of the preferred embodiment of the invention and best mode for practicing the invention are provided for the purpose of illustration only and not for the purpose of limitation—the invention being defined by the claims.

We claim:

1. A computer-implemented land planning system designed to generate at least one conceptual fit and cost-optimized solution to a user-defined land development problem, said system comprising:
   means for electronically creating a population of candidate solutions to the land development problem, each candidate solution comprising a plurality of interrelated engineering measurements applicable in development of an undeveloped land site, and said plurality of engineering measurements being selected from a group consisting of grading, building pad layout, and utilities;
   means for accessing a cost model comprising cost data for said plurality of engineering measurements;
   means employing an iterative, heuristic problem-solving strategy to manipulate the engineering measurements of said candidate solutions until a population of cost-optimized fit solutions to the land development problem is achieved, whereby a change relative to one of said plurality of engineering measurements for a given candidate solution effects a change relative to another of said plurality of engineering measurements for that candidate solution;
   means for selecting a set of optimally different alternative solutions from said population of cost-optimized fit solutions; and
   means for outputting to a user documentation illustrating said optimally different alternative cost-optimized solutions to the land development problem.

2. A computer-implemented land planning system according to claim 1, and comprising means for digitally representing the undeveloped land site in three-dimensional space.

3. A computer-implemented land planning system according to claim 2, and comprising means for conceptually locating said engineering measurements within said three-dimensional space.

4. A computer-implemented land planning system according to claim 1, wherein said engineering measurements are selected from a further group consisting of storm water system, sanitary sewer collection system, and potable water system.

5. A computer-implemented land planning system according to claim 1, wherein said documentation comprises a least one computer-generated drawing.

6. A computer-implemented land planning system according to claim 5, wherein said documentation further comprises an itemized cost listing of said engineering measurements.

7. A computer-implemented land planning system according to claim 1, wherein said documentation is delivered to the user via a global communications network.

8. A computer-implemented land planning system designed to generate at least one conceptual fit and cost optimized solution to a user-defined land development problem, said system comprising:
   means for accessing land development constraints for an undeveloped land site;
   means for electronically creating a population of candidate solutions to the land development problem, each candidate solution comprising a plurality of interrelated engineering measurements applicable in development of the undeveloped land site, and said plurality of engineering measurements being selected from a group consisting of building pad, parking lot and access roads, storm water collection system, sanitary sewer collection system, and potable water system;
   means for accessing a cost model comprising respective cost data for each of said engineering measurements;
   means for discarding unfit solutions which violate said land development constraints;
   for each remaining solution, means for calculating a fitness score based on said cost data for said engineering measurements;
   means for employing an iterative, heuristic problem-solving strategy for manipulating said engineering measurements of respective select candidate solutions to achieve increased fitness scores until a population of cost-optimized fit solutions is achieved, whereby a change relative to one of said plurality of engineering measurements for a given candidate solution effects a change relative to another of said plurality of engineering measurements for that candidate solution;
   means for selecting a set of optimally different alternative solutions from said population of cost-optimized fit solutions; and
   means for outputting to a user documentation illustrating said optimally different alternative cost-optimized solutions to the land development problem.

9. A computer-implemented land planning system according to claim 8, and comprising means for accessing user preferences for the undeveloped land site.

10. A computer-implemented land planning system according to claim 9, and comprising means for penalizing the fitness score of a candidate solution based on violation of a user preference.

11. A computer-implemented land planning system according to claim 8, and comprising means for digitally representing the undeveloped land site in three-dimensional space.

12. A computer-implemented land planning system according to claim 11, and comprising means for conceptually locating said engineering measurements within said three-dimensional space.

13. A computer-implemented land planning system according to claim 8, wherein said documentation comprises at least one computer-generated drawing.

14. A computer-implemented land planning system according to claim 13, wherein said documentation further comprises an itemized cost listing of said engineering measurements.

15. A computer-implemented land planning system according to claim 8, wherein said documentation is delivered to the user via a global communications network.

16. A computer-implemented land planning method designed to generate at least one conceptual fit and cost-optimized solution to a user-defined land development problem, said method comprising:

electronically creating at least one candidate solution to the land development problem, the candidate solution comprising a plurality of interrelated engineering measurements applicable in development of an undeveloped land site, and the plurality of engineering measurements being selected from a group consisting of grading, building pad layout, and utilities;

employing an iterative heuristic problem-solving strategy for manipulating the engineering measurements of the candidate solution until a population of cost-optimized fit solutions to the land development problem is achieved, whereby a change relative to one of the plurality of engineering measurements for the candidate solution effects a change relative to another of the plurality of engineering measurements for that candidate solution;

selecting a set of optimally different alternative solutions from the population of cost-optimized fit solutions; and outputting to a user documentation illustrating the optimally different alternative cost-optimized solutions to the land development problem.

17. A computer-implemented land planning method according to claim 16, and comprising digitally representing the undeveloped land site in three-dimensional space.

18. A computer-implemented land planning method according to claim 17, and comprising conceptually locating the engineering measurements within the three-dimensional space.

19. A computer-implemented land planning method according to claim 16, and comprising delivering the documentation to the user via a global communications network.

\* \* \* \* \*